United States Patent
Zhang et al.

(10) Patent No.: US 10,613,498 B2
(45) Date of Patent: Apr. 7, 2020

(54) METHOD FOR CONTROLLING DEVICE BY REMOTE CONTROL DEVICE

(71) Applicant: Xiaomi Inc., Beijing (CN)

(72) Inventors: Xiao Zhang, Beijing (CN); Enxing Hou, Beijing (CN); Hong Chen, Beijing (CN)

(73) Assignee: XIAOMI INC., Beijing (CN)

( * ) Notice: Subject to any disclaimer, the term of this patent is extended or adjusted under 35 U.S.C. 154(b) by 220 days.

(21) Appl. No.: 15/218,086

(22) Filed: Jul. 25, 2016

(65) Prior Publication Data

US 2017/0075328 A1     Mar. 16, 2017

(30) Foreign Application Priority Data

Sep. 16, 2015   (CN) .......................... 2015 1 0590534

(51) Int. Cl.
*G05B 19/042*     (2006.01)
*H04W 4/80*       (2018.01)
(Continued)

(52) U.S. Cl.
CPC .......... *G05B 19/042* (2013.01); *G08C 17/00* (2013.01); *H04L 67/125* (2013.01);
(Continued)

(58) Field of Classification Search
CPC ............. F24F 11/30; G05B 2219/2614; G05B 2219/32128; H04N 21/4223;
(Continued)

(56) References Cited

U.S. PATENT DOCUMENTS 6,111,561 A  *  8/2000  Brandau ............... G06F 11/328
                                                        345/660
6,333,739 B1 *  12/2001  Koyama ................. H04L 41/22
                                                        707/999.01
(Continued)

FOREIGN PATENT DOCUMENTS

CN          102024317 A       4/2011
CN          102945592 A       2/2013
(Continued)

OTHER PUBLICATIONS

Extended European Search Report from EPO for EP application 16186163.
(Continued)

*Primary Examiner* — Darrin D Dunn
(74) *Attorney, Agent, or Firm* — Jun He Law Offices P.C.; James J. Zhu

(57) ABSTRACT

A method for controlling a device by a terminal device and the terminal device thereof are provided. The method includes: identifying an identity image of a controlled device; obtaining a control interface of the controlled device according to the identity image; receiving a control operation instruction triggered by a user through the control interface; and sending the control operation instruction to the controlled device by establishing communication connection with the controlled device. The user may identify respective controlled devices and obtain corresponding control interfaces of the controlled devices conveniently in a manner of identifying identity images of respective controlled devices by the same user terminal, and thus realize convenient control over the controlled devices through the control interfaces, so as to improve the convenience and accuracy of controlling the respective controlled devices.

10 Claims, 7 Drawing Sheets

(51) Int. Cl.
*G08C 17/00* (2006.01)
*H04L 29/08* (2006.01)
*H04M 1/725* (2006.01)

(52) U.S. Cl.
CPC ......... *H04M 1/72533* (2013.01); *H04W 4/80* (2018.02); *G05B 2219/36133* (2013.01); *G08C 2201/20* (2013.01); *G08C 2201/30* (2013.01); *G08C 2201/50* (2013.01); *G08C 2201/93* (2013.01)

(58) Field of Classification Search
CPC ............ H04N 1/00363; H04N 1/2112; G02B 2027/0138; G02B 27/0172; G06F 3/00; G06F 3/048; G06F 3/04842; G06F 3/04847; G06F 3/04897; G06K 9/18; H04L 12/282; H04L 29/06; H04L 29/12009; H04L 41/0886; H04L 67/025; H05B 37/0227; H05B 37/029; Y02B 70/3275
See application file for complete search history.

(56) References Cited

U.S. PATENT DOCUMENTS

| | | | | |
|---|---|---|---|---|
| 6,473,811 B1 * | 10/2002 | Onsen | ............... | H04N 1/00278 709/223 |
| 8,362,906 B1 * | 1/2013 | Glassman | ........ | H04N 21/42204 219/714 |
| 8,594,632 B1 * | 11/2013 | Azizi | ................... | H04W 12/06 455/411 |
| 2003/0158932 A1 * | 8/2003 | Machida | ................ | H04L 41/22 709/224 |
| 2005/0034160 A1 * | 2/2005 | Kim | ................... | H04L 12/2805 725/80 |
| 2006/0149967 A1 * | 7/2006 | Lee | ..................... | H04L 63/0492 713/168 |
| 2006/0195412 A1 | 8/2006 | Slemmer et al. | | |
| 2007/0038464 A1 | 2/2007 | Sato et al. | | |
| 2007/0197236 A1 * | 8/2007 | Ahn | ................... | H04L 12/2809 455/466 |
| 2007/0263645 A1 | 11/2007 | Kreiner et al. | | |
| 2009/0285443 A1 * | 11/2009 | Camp, Jr. | .............. | G08C 17/02 382/100 |
| 2010/0134318 A1 * | 6/2010 | Haughawout | ......... | G08C 19/28 340/12.25 |
| 2010/0321351 A1 * | 12/2010 | Lee | ........................ | H04N 5/445 345/204 |
| 2011/0007637 A1 * | 1/2011 | Chen | ................. | H04M 1/72519 370/252 |
| 2011/0106279 A1 * | 5/2011 | Cho | ........................ | G08C 17/02 700/90 |
| 2012/0068857 A1 | 3/2012 | Rothkopf | | |
| 2012/0146918 A1 * | 6/2012 | Kreiner | .............. | H04M 1/7253 345/173 |
| 2012/0158922 A1 * | 6/2012 | Aggarwal | ............ | H04L 63/104 709/220 |
| 2013/0024816 A1 * | 1/2013 | Bender | ................... | G06F 9/451 715/835 |
| 2014/0013100 A1 * | 1/2014 | Menzel | ........... | H04N 21/43637 713/150 |
| 2014/0215101 A1 * | 7/2014 | Ohyama | ................... | G06F 3/14 710/19 |
| 2014/0307106 A1 * | 10/2014 | Hughes | ........... | H04N 21/25833 348/191 |
| 2015/0009022 A1 * | 1/2015 | Cho | ....................... | G08C 17/02 340/12.53 |
| 2015/0286515 A1 * | 10/2015 | Monk | ................... | G06F 11/079 714/57 |
| 2015/0317115 A1 * | 11/2015 | Asai | ...................... | G06F 3/1236 358/1.15 |
| 2015/0356378 A1 * | 12/2015 | Lim | .................... | H04M 1/2755 235/375 |
| 2015/0359149 A1 * | 12/2015 | Itoh | ..................... | H05K 13/0465 29/834 |
| 2016/0299735 A1 * | 10/2016 | Oztaskent | ............... | G06F 3/033 |
| 2016/0301543 A1 * | 10/2016 | Minezawa | ............. | G08C 17/02 |
| 2017/0048901 A1 * | 2/2017 | Finch | .................... | H04W 12/06 |
| 2017/0163438 A1 * | 6/2017 | Gary, Jr. | ............. | H04L 12/2818 |
| 2017/0249745 A1 * | 8/2017 | Fiala | ........................ | G06T 7/13 |
| 2017/0311368 A1 * | 10/2017 | Kandur Raja | ........ | H04W 76/14 |
| 2017/0324840 A1 * | 11/2017 | Mathison | ................ | H04L 67/36 |
| 2018/0007722 A1 * | 1/2018 | Cohn | ................... | H04L 67/1044 |
| 2018/0167577 A1 * | 6/2018 | Ryu | ...................... | H04N 21/436 |
| 2018/0204385 A1 * | 7/2018 | Sarangdhar | .............. | H04L 67/18 |
| 2019/0159105 A1 * | 5/2019 | Watanabe | ............... | H04L 41/22 |
| 2019/0266886 A1 * | 8/2019 | Jiang | .................. | G06F 16/5838 |
| 2019/0306902 A1 * | 10/2019 | Debates | ............ | G06K 9/00664 |

FOREIGN PATENT DOCUMENTS

| | | |
|---|---|---|
| CN | 103023523 A | 4/2013 |
| CN | 103581251 A | 2/2014 |
| CN | 104618783 A | 5/2015 |
| CN | 105160854 A | 12/2015 |
| EP | 2528351 A1 | 11/2012 |
| JP | 2012142907 A | 7/2012 |
| JP | 2015005856 A | 1/2015 |
| JP | 2015106760 A | 6/2015 |
| WO | 2007048823 A1 | 5/2007 |
| WO | 2011086956 A1 | 7/2011 |
| WO | 2013024922 A | 2/2013 |

OTHER PUBLICATIONS

International Search Report for PCT Application No. PCT/CN2015/099699.

Office action from JPO for JP application 2016571391 and corresponding English translation, dated Jan. 9, 2018.

Search report of office action from RPO for RU application 2016141137, dated Mar. 28, 2018.

Office action from RPO for RU application 2016141137, dated Mar. 28, 2018.

The First Office Action in Chinese Patent Application No. 201510590534.9, dated Apr. 4, 2018.

* cited by examiner

METHOD FOR CONTROLLING DEVICE BY REMOTE CONTROL DEVICE

CROSS-REFERENCE TO RELATED APPLICATIONS

This application is based on and claims priority to Chinese Patent Application No. 201510590534.9, filed on Sep. 16, 2015, the entire contents of which are incorporated herein by reference.

FIELD

The present disclosure relates to the field of data processing technology, and more particularly, to a method for controlling a device by a terminal device and the terminal device thereof.

BACKGROUND

With the constant development of smart home applications, there are more and more intelligent devices in each family. It is a significant issue that how to control various intelligent devices smartly and conveniently, in order to create a smart and comfortable living environment.

For a conventional control method, the control is usually realized directly by a control button on various intelligent devices or a matching control unit (e.g. a remote controller).

SUMMARY

Embodiments of the present disclosure provide a method and apparatus for controlling a device, and a terminal device, to make users control intelligent devices more conveniently.

According to a first aspect of embodiments of the present disclosure, there is provided a method for controlling a device. The method includes: identifying an identity image of a controlled device; obtaining a control interface of the controlled device according to the identity image; receiving a control operation instruction triggered by a user through the control interface; and sending the control operation instruction to the controlled device by establishing communication connection with the controlled device.

According to a second aspect of embodiments of the present disclosure, there is provided a terminal device. The terminal device includes: a processor, and a memory configured to store an instruction executable by the processor, in which the processor is configured to: identify an identity image of a controlled device; obtain a control interface of the controlled device according to the identity image; receive a control operation instruction triggered by a user through the control interface; and send the control operation instruction to the controlled device by establishing communication connection with the controlled device.

According to a third aspect of embodiments of the present disclosure, there is provided a non-transitory computer-readable storage medium having stored therein instructions that, when executed by a processor of a terminal device, causes the terminal device to perform a method for controlling a device, the method including: identifying an identity image of a controlled device; obtaining a control interface of the controlled device according to the identity image; receiving a control operation instruction triggered by a user through the control interface; and sending the control operation instruction to the controlled device by establishing communication connection with the controlled device.

The above technical solutions may include the following advantageous effects.

When it is required to control the controlled device, a terminal device of the user identifies the controlled device by identifying the identity image of the controlled device. Accordingly, the user is able to trigger the control operation of the controlled device through the control interface after accessing the control interface of the controlled device according to the identity image. Hence the terminal device sends the control operation to the controlled device by the communication connection established with the controlled device, so as to realize the control over the controlled device. Thus, the user may identify respective controlled devices and obtain corresponding control interfaces of the controlled devices conveniently in a manner of identifying identity images of respective controlled devices by the same user terminal, and thus realize convenient control over the controlled devices through the control interfaces, so as to improve the convenience of controlling the respective controlled devices.

Moreover, the terminal device of the user accesses the control interface of the controlled device according to the identity image by identifying the identity image of the controlled device, and establishes the communication connection with the controlled device if it is determined according to the connection status indicator that there is no communication connection with the controlled device. Then, it is possible to obtain the operating status of the controlled device based on the communication connection or by accessing the server, and set the display status of the corresponding control key on the control interface according to the operating status, so as to make the status of each control key displayed on the control interface timely and accurate. Consequently, the user may realize the control over the controlled device conveniently and accurately by triggering the control operation of the controlled device on the control interface.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

With the above accompanying drawings, exact embodiments of the present disclosure have been presented and will be described in detail hereinafter. The accompanying drawings and descriptions are used to illustrate concepts of the present disclosure to those skilled in the art with reference to particular embodiments, rather than to limit the scope of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
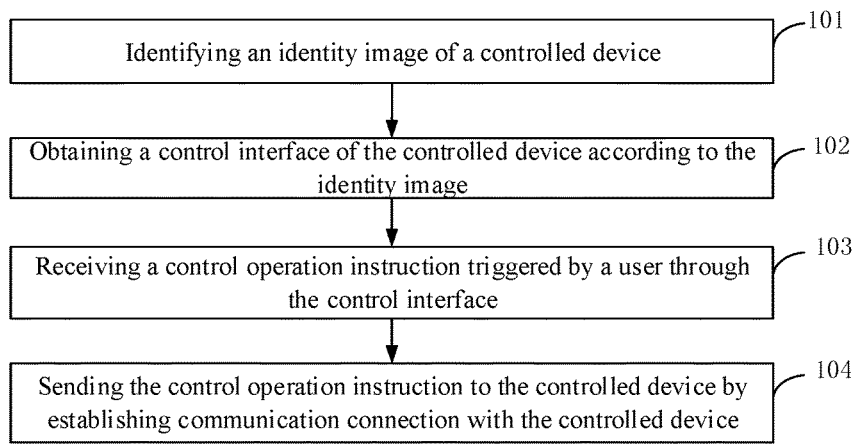
FIG. 1 is a flow chart of a first embodiment of a method for controlling a device according to an exemplary embodiment.

FIG. 1 is a flow chart of a first embodiment of a method for controlling a device according to an exemplary embodiment. The executive body of the method may be a mobile phone, which may control various intelligent devices (such as refrigerators, televisions and air conditioners) in the house. As shown in FIG. 1, the method includes the following steps.

In step 101, an identity image of a controlled device is identified.

In step 102, a control interface of the controlled device is obtained according to the identity image.

In step 103, a control operation instruction triggered by a user through the control interface is received.

In step 104, the control operation instruction is sent to the controlled device by establishing communication connection with the controlled device.

This embodiment is illustrated in a family scene as an example. There are various devices in the house, such as a television, a refrigerator, an air conditioner and a water heater. These devices are called controlled devices. Each controlled device is supposed to be stamped with an identity image used for identifying the controlled device, and the identity image may be a two-dimensional code image, as an example. The identity image of each controlled device includes various attribute information of the controlled device, such as a device identifier, a model and a manufacturer.

Moreover, assuming that each controlled device has a communication function, the user may establish the communication connection with each controlled device using the mobile phone in a home network. The establishment of the communication connection may realize binding connections between the mobile phone and each controlled device through Wi-Fi.

If the user wants to achieve control over a certain controlled device using the mobile phone, it is possible to identify the identity image of the controlled device by scanning, which thus triggers the control process of the controlled device automatically.

In order to achieve accurate control over the controlled device, the control interface of the controlled device needs to be obtained first. The control interface includes: a control menu of the controlled device, respective control keys, and operating status information of the controlled device represented by each control key. The operating status information of the controlled device reflects the current operating status thereof, like on/off and current temperature.

In this embodiment, the control interface of the controlled device may be obtained according to the identity image. Specifically, the mobile phone may inquire and obtain the control interface corresponding to the identity image of the controlled device from a database containing the information of correspondence relationships between identity images of respective controlled devices and control interfaces of respective controlled devices.

The database may be stored in the mobile phone, in which case the identity images of respective controlled devices stored in the database are those of controlled devices contained in the user's house. Correspondingly, the control interfaces of respective controlled devices are inquired and obtained from a server. That is, the mobile phone may send the identified identity images of respective controlled devices to the server; the server analyzes the identity images, for example, to obtain device identifiers of controlled devices, and thus obtains the control interfaces corresponding to the device identifiers and returns the control interfaces to the mobile phone; the mobile phone associates and stores the received control interfaces and corresponding identity images in the above database.

Alternatively, the database may be stored in the server, in which case the mobile phone sends the identified identity image to the server; the server inquires and obtains the control interface corresponding to the of the controlled device from the database stored with the correspondence relationships between identity images of respective controlled devices and control interfaces of respective controlled devices. The identity images and control interfaces of the respective controlled devices stored in the server may be those of a large number of different devices. Many users may register in the server to obtain the identity images of lots of devices, and the server may interact with the registered devices to obtain the control interfaces of respective devices.

In this embodiment, when it is required to control the controlled device, the terminal device of the user identifies the controlled device by identifying the identity image of the controlled device; the user is able to trigger the control operation of the controlled device through the control interface after obtaining the control interface of the controlled device according to the identity image; hence the terminal device sends the control operation to the controlled device by the communication connection established with the controlled device, so as to realize the control over the controlled device. In some embodiments, the terminal device displays the control interface to permit the user to input control operation instructions through the control interface. In this technical solution, the user may identify respective controlled devices and obtain corresponding control interfaces of the controlled devices conveniently by identifying and obtaining identity images of respective controlled devices using the same user terminal, and thus realize convenient control over the controlled device.

Figure 2:
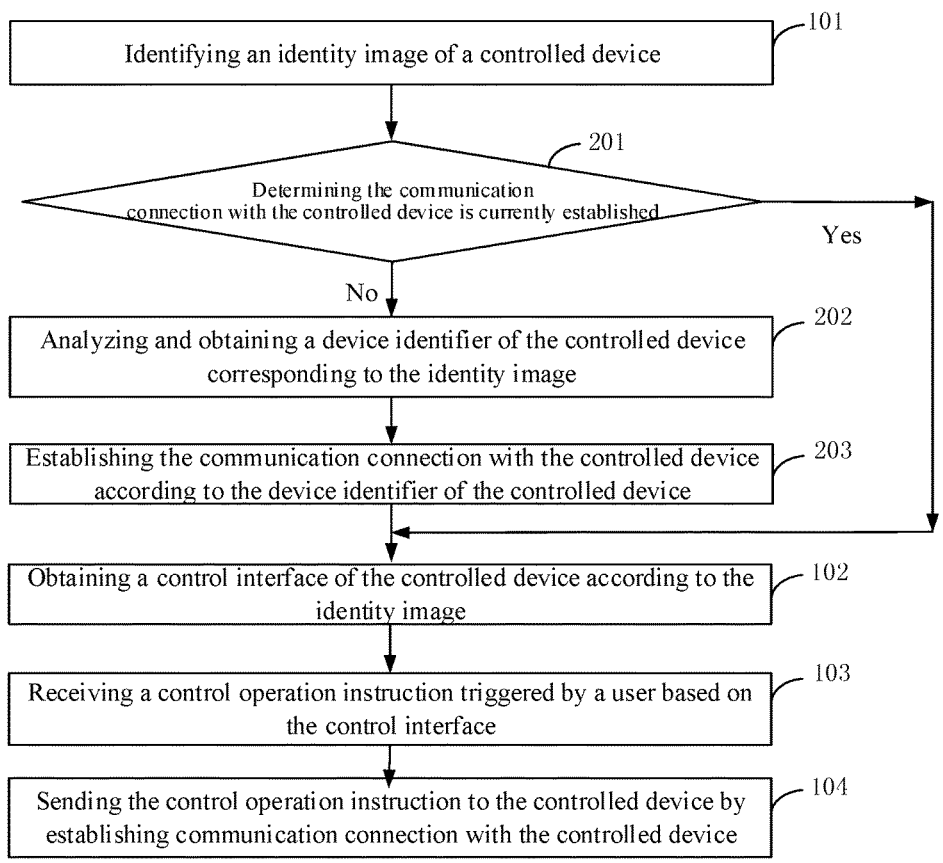
FIG. 2 is a flow chart of a second embodiment of a method for controlling a device according to an exemplary embodiment.

FIG. 2 is a flow chart of a second embodiment of a method for controlling a device according to an exemplary embodiment. As shown in FIG. 2, based on the embodiment shown in FIG. 1, before step 104, the method may further include the following steps.

In step 201, it is determined whether the communication connection with the controlled device is currently established according to an indicator of connection status corresponding to the identity image. If the communication connection with the controlled device is not established, steps 202 to 203 followed by steps 102 to 104 are executed; if the communication connection with the controlled device is currently established, steps 102 to 104 are executed directly.

It shall be noted that step 201 is not in a strict sequential relationship with steps 202-203 as long as step 201 is executed after step 101 and before step 104. FIG. 2 exemplifies that step 201 is executed after step 101.

In practical applications, the mobile phone does not remain the communication connection with respective controlled devices all the time, and there may be no communication connection between the mobile phone and the controlled device when the user wants to control a certain controlled device. Therefore, in this embodiment, it is necessary to determine whether there is communication connection between the mobile phone and the controlled device.

Specifically, it is determined according to the indicator of connection status. The user scans and obtains the identity image of the controlled device using the mobile phone, and obtains the control interface of the controlled device according to the identity image. It is configurable to associate and display the indication message of connection status that is used to represent whether there is communication connection between the mobile phone and the controlled device, for example, displaying "connection established" or "no connection established" at the same time of displaying the control interface.

The indication of connection status may be set as "connection established" during communicating the mobile phone with the controlled device and in the duration of the communication connection; the indication of connection status may be set as "no connection established" when the communication connection between the mobile phone and the controlled device is interrupted.

It can be understood that the mobile phone may maintain correspondence relationships between the identity images of respective controlled devices and the indications of connection status, such that the mobile phone may inquire and determine whether the indication of corresponding connection status indicates there is a communication connection with the controlled device, after obtaining the identity image of the certain controlled device by scanning.

In step 202, a device identifier of the controlled device corresponding to the identity image is analyzed and obtained, if the communication connection with the controlled device is not established.

In step 203, the communication connection with the controlled device is established according to the device identifier of the controlled device.

If it is determined that there is no communication connection with the controlled device according to the indication of connection status, it is necessary to establish the communication connection with the controlled device, in order to facilitate wireless control over the controlled device based on the communication connection afterwards.

Specifically, the mobile phone may obtain the device identifier of the controlled device contained in the identity image by analyzing the identity image, and then send a connection establishing request with the device identifier via Wi-Fi. In such a way, the controlled device corresponding to the device identifier returns a connection establishing response after receiving the connection establishing request, so as to realize the establishment of communication connection between the mobile phone and the controlled device.

In this embodiment, when it is required to control the controlled device, the user terminal obtains the control interface of the controlled device according to the identity image by identifying the identity image of the controlled device, and establishes the communication connection with the controlled device if it is determined according to the indication of connection status that there is no communication connection with the controlled device. Then, it is possible to send the control operation to the controlled device via the communication connection after the user triggers the control operation of the controlled device on the control interface, so as to achieve the control over the controlled device conveniently and accurately.

In the above embodiments, the obtained control interface of the controlled device includes the operating status information of the controlled device, so that the display status of each control key on the control interface is consistent with the operating status of the controlled device. For example, if the controlled device is in an open status, the control key corresponding to the on-state on the control interface turns red. However, such situation may occur in practical applications—the control interface of the controlled device obtained by the mobile phone according to the identity image of the controlled device from the above database does not reflect real-time information. Thus, embodiments of the present disclosure provide an approach (shown in FIG. 3) to solve this problem.

Figure 3:
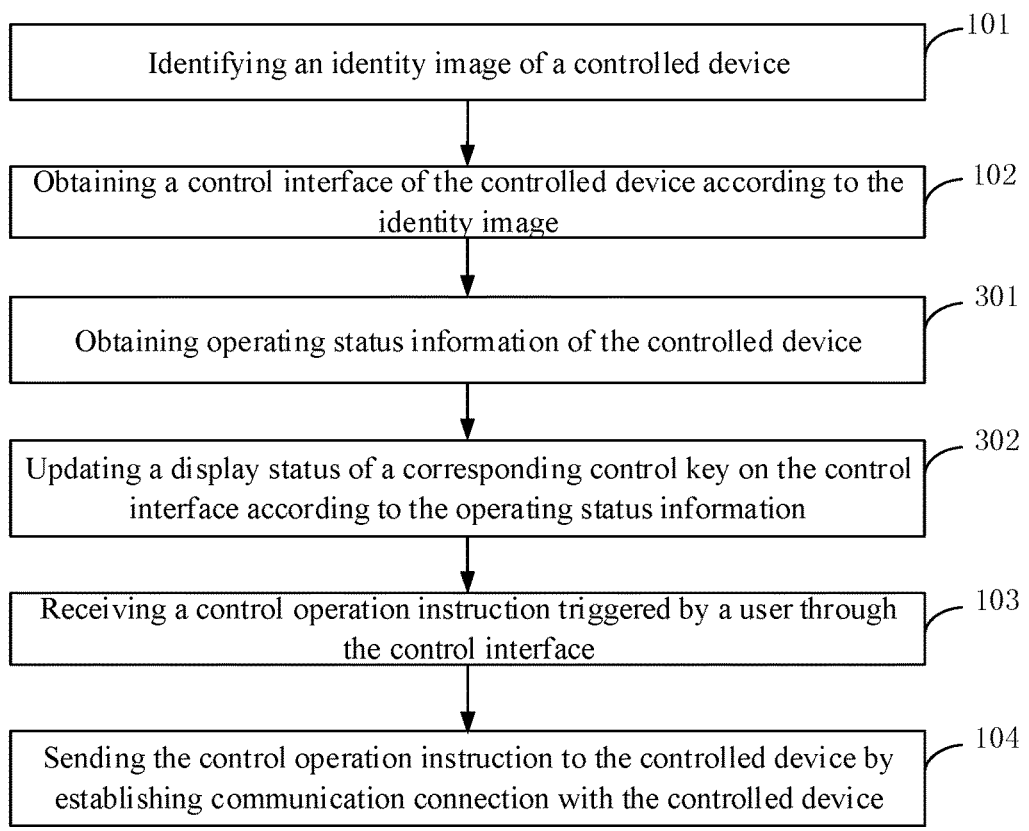
FIG. 3 is a flow chart of a third embodiment of a method for controlling a device according to an exemplary embodiment.

FIG. 3 is a flow chart of a third embodiment of a method for controlling a device according to an exemplary embodiment. As shown in FIG. 3, based on the embodiment of FIG. 1 or FIG. 2, the method may further include the following steps before step 103.

In step 301, the operating status information of the controlled device is obtained.

In step 302, the display status of the corresponding control key on the control interface is updated according to the operating status information.

Consequently, in step 103, the user triggers the control operation instruction according to the updated control interface.

In this embodiment, the mobile phone may obtain the information of operating status of the controlled device almost in real time after identifying the controlled device. The display status of the corresponding control key on the updated control interface has a better consistency with the current operating status of the controlled device.

Figure 4:
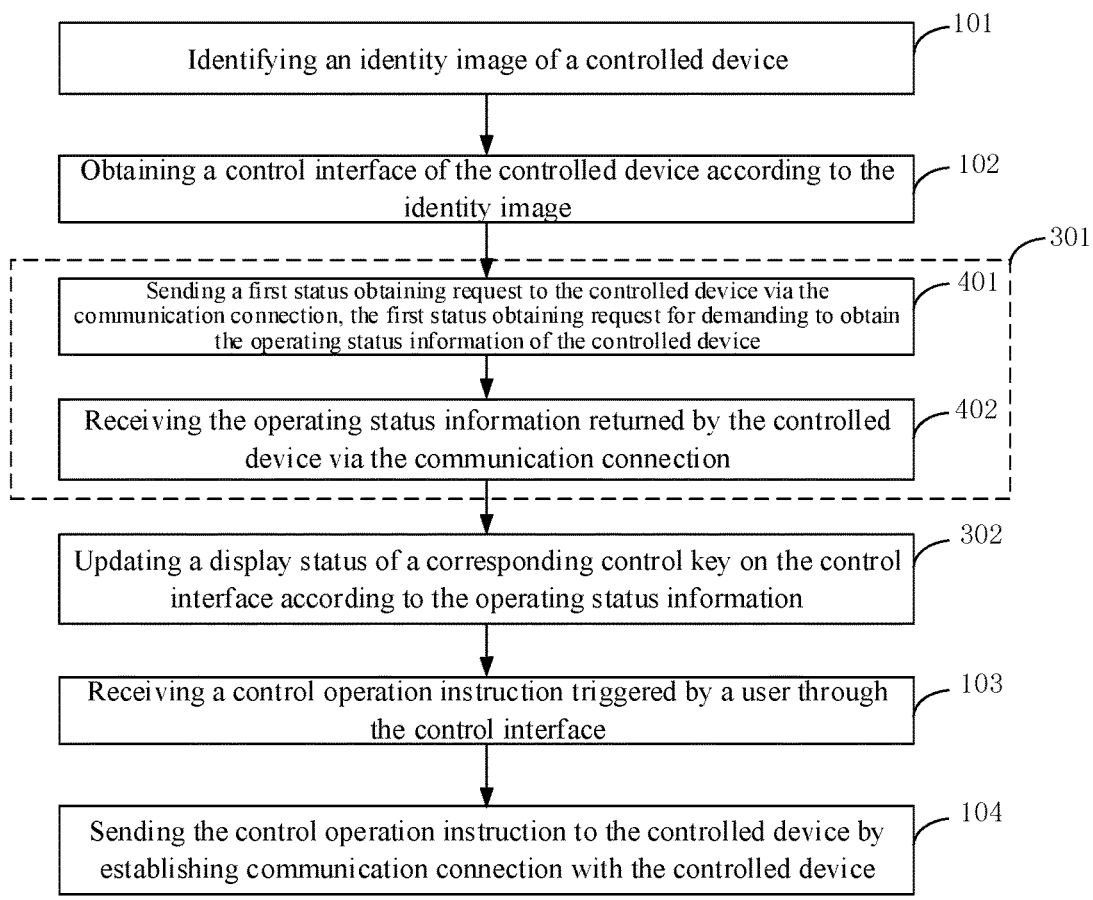
FIG. 4 is a flow chart of an implementation of step 301.
Figure 5:
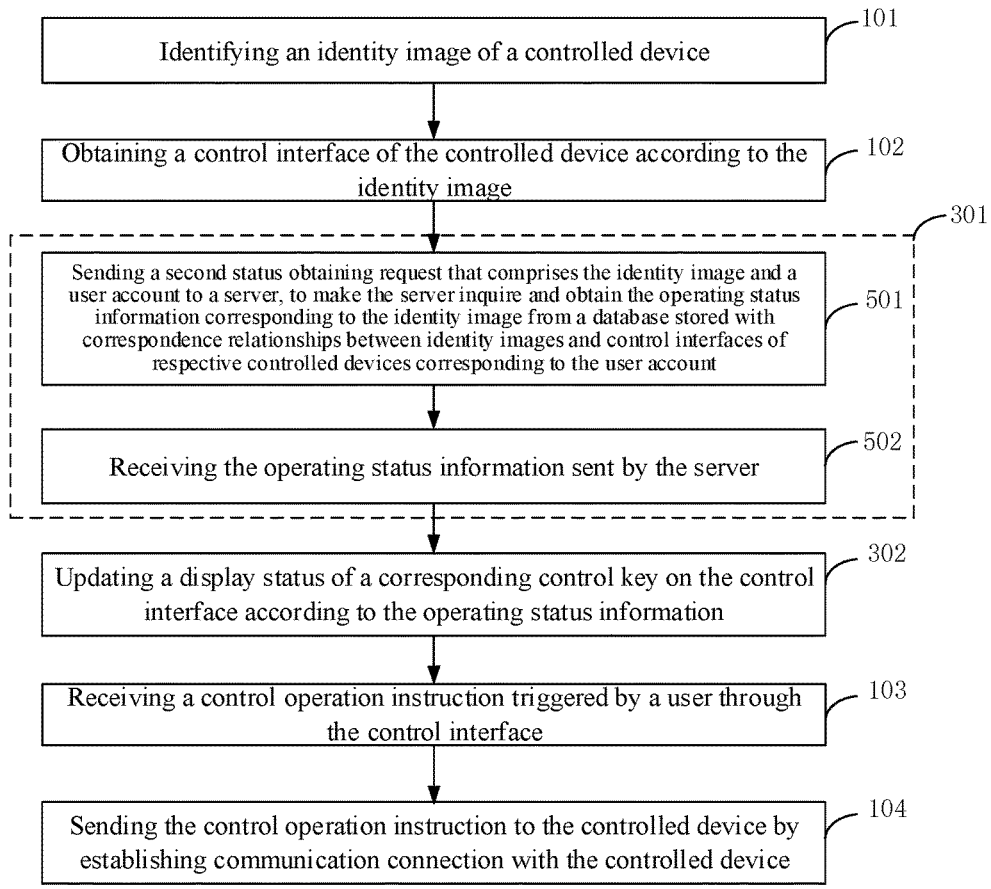
FIG. 5 is a flow chart of another implementation of step 301.

Specifically, step 301 may be implemented in two ways shown in FIGS. 4 and 5.

FIG. 4 is a flow chart of an implementation of step 301. As shown in FIG. 4, steps are presented as follows.

In step 401, a first status obtaining request is sent to the controlled device via the communication connection, in which the first status obtaining request is used for demanding to obtain the operating status information of the controlled device.

In step 402, the operating status information returned by the controlled device is received via the communication connection.

In this embodiment, the mobile phone may send the first status obtaining request used for demanding to obtain the operating status information of the controlled device to the controlled device, and receive the operating status information returned by the controlled device, based on the communication connection established with the controlled device.

The mobile phone may display the control interface after obtaining the control interface of the controlled device and the operating status information thereof, such that the user triggers the control operation instruction through control operation on the control interface, with the knowledge of current operating status information of the controlled device. Then, the mobile phone sends the control operation instruction to the controlled device via the communication connection established with the controlled device, and the controlled device executes the control operation instruction, so as to realize the control over the controlled device. For example, the control operation of the user on the control interface may be "turning off the operating air conditioner," "adjusting the cooling temperature of the air conditioner," and "changing the illumination mode of the lamp."

In this embodiment, the display status of corresponding control keys on the control interface of the controlled device may be updated directly according to the operating status information (i.e. the corresponding control keys on the control interface may be set according to the operating status information) after the operating status information of the controlled device is obtained, such that the user may have a more intuitive understanding of the current operating status of the controlled device.

Since the obtained operating status information is real-time, the control over the controlled device is more accurate.

FIG. 5 is a flow chart of another implementation of step 301. As shown in FIG. 5, the steps are presented as follows.

In step 501, a second status obtaining request is sent to the server, in which the second status obtaining request includes the identity image and a user account, so as to make the server inquire and obtain the operating status information corresponding to the identity image from the database containing correspondence relationships between identity images and control interfaces of respective controlled devices corresponding to the user account.

In step 502, the operating status information sent by the server is received.

This embodiment provides a method for inquiring and obtaining the operating status information of the controlled device through the server.

If the mobile phone, for example, is used to control various controlled devices in the house, the user may register the user account in the server and send the identity images of respective controlled devices in the house to the server; then the server stores the identity images sent by the user in the database corresponding to the user account. In addition, it is possible to upload their own operating statuses to the server in real time based on the communication connection between the respective controlled devices and the server; the server stores the operating status information uploaded by the respective controlled devices in the database corresponding to the user account and associates the operating status information with the identity images of the respective controlled devices.

Consequently, if the user wants to control some controlled device, it is possible to send the obtaining request containing the user account and the identity image of the controlled device to the server using a mobile phone, i.e. the above second status obtaining request. In such a way, the server inquires and obtains the operating status information corresponding to the identity image from the database corresponding to the user account and sends the operating status information to the mobile phone.

In this embodiment, since the obtained operating status information is real-time, the control over the controlled device is more accurate.

Figure 6:
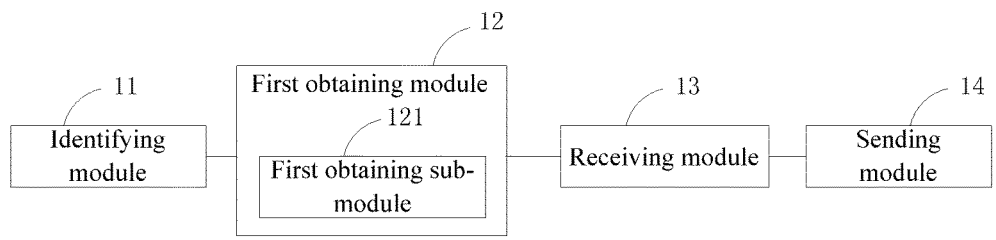
FIG. 6 is a block diagram of a first embodiment of an apparatus for controlling a device according to an exemplary embodiment.

FIG. 6 is a block diagram of a first embodiment of an apparatus for controlling a device according to an exemplary embodiment. As shown in FIG. 6, the apparatus includes: an identifying module 11, a first obtaining module 12, a receiving module 13 and a sending module 14.

The identifying module 11 is configured to identify an identity image of a controlled device; the first obtaining module 12 is configured to obtain a control interface of the controlled device according to the identity image identified by the identifying module 11; the receiving module 13 is configured to receive a control operation instruction triggered by a user through the control interface obtained by the first obtaining module 12; and the sending module 14 is configured to send the control operation instruction received by the receiving module 13 to the controlled device by establishing communication connection with the controlled device.

The first obtaining module 12 includes a first obtaining sub-module 121.

The first obtaining sub-module 121 is configured to inquire and obtain the control interface corresponding to the identity image from a database containing the information of correspondence relationships between identity images and control interfaces of respective controlled devices.

The apparatus in this embodiment may implement the technical solution shown in the method embodiment of FIG. 1, and the implementation principle and technical effect are similar, which will not be elaborated.

Figure 7:
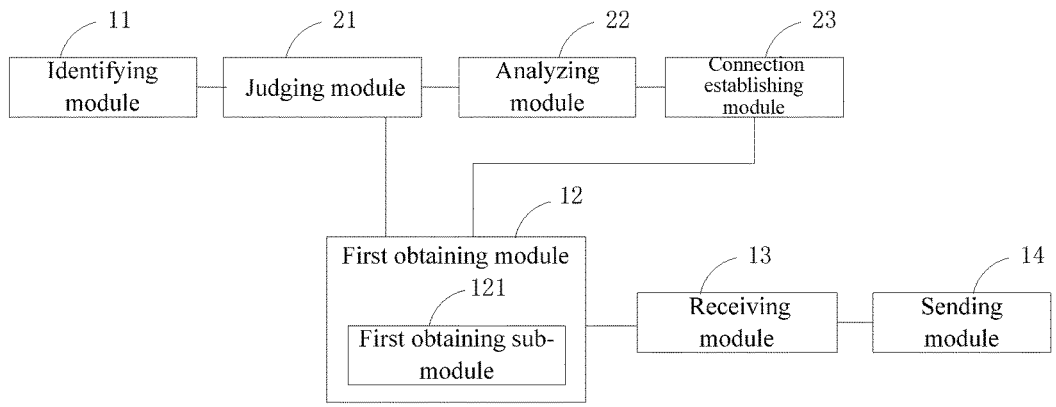
FIG. 7 is a block diagram of a second embodiment of an apparatus for controlling a device according to an exemplary embodiment.

FIG. 7 is a block diagram of a second embodiment of an apparatus for controlling a device according to an exemplary embodiment. As shown in FIG. 7, based on the embodiment of FIG. 6, the apparatus further includes: a judging module 21, an analyzing module 22 and a connection establishing module 23.

The judging module 21 is configured to judge whether the communication connection with the controlled device is currently established according to an indication of connection status corresponding to the identity image identified by the identifying module 11; the analyzing module 22 is configured to analyze and obtain a device identifier of the controlled device corresponding to the identity image if it is determined by the judging module 21 that the communication connection with the controlled device is not established; and the connection establishing module 23 is configured to establish the communication connection with the controlled device according to the device identifier of the controlled device analyzed by the analyzing module 22.

The apparatus in this embodiment may implement the technical solution shown in the method embodiment of FIG. 2, and the implementation principle and technical effect are similar, which will not be elaborated.

Figure 8:
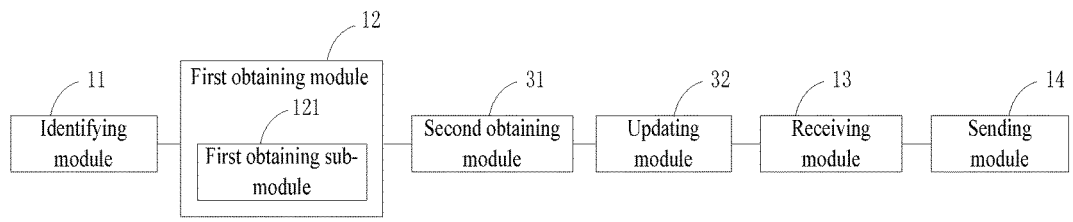
FIG. 8 is a block diagram of a third embodiment of an apparatus for controlling a device according to an exemplary embodiment.

FIG. 8 is a block diagram of a third embodiment of an apparatus for controlling a device according to an exemplary embodiment. As shown in FIG. 8, based on the embodiment of FIG. 6 or FIG. 7, the apparatus further includes: a second obtaining module 31 and an updating module 32.

The second obtaining module 31 is configured to obtain operating status information of the controlled device; the updating module 32 is configured to update a display status of a corresponding control key on the control interface obtained by the first obtaining module 12 according to the operating status information obtained by the second obtaining module 31.

The apparatus in this embodiment may implement the technical solution shown in the method embodiment of FIG. 3, and the implementation principle and technical effect are similar, which will not be elaborated.

Figure 9:
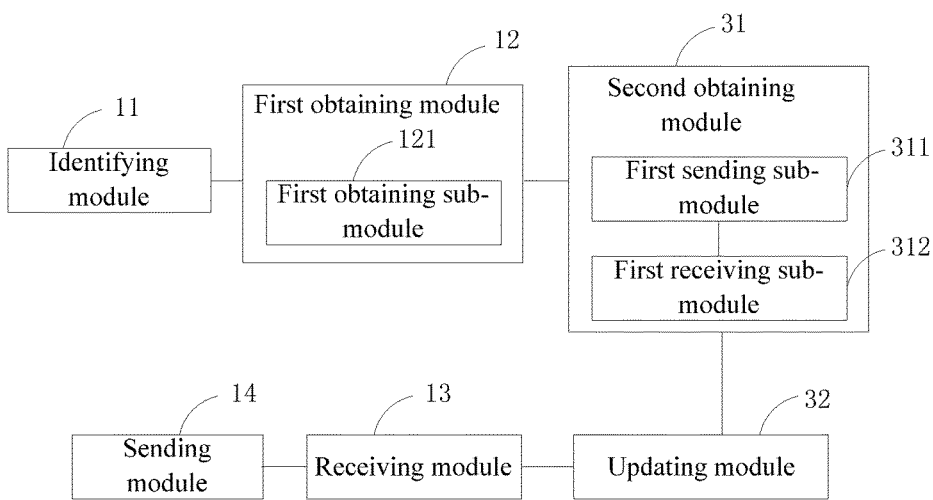
FIG. 9 is a block diagram of a fourth embodiment of an apparatus for controlling a device according to an exemplary embodiment.

FIG. 9 is a block diagram of a fourth embodiment of an apparatus for controlling a device according to an exemplary embodiment. As shown in FIG. 9, based on the embodiment of FIG. 8, the second obtaining module 31 includes: a first sending sub-module 311 and a first receiving sub-module 312.

The first sending sub-module 311 is configured to send a first status obtaining request to the controlled device via the communication connection, and the first status obtaining request demands to obtain the operating status information of the controlled device; the first receiving sub-module 312 is configured to receive the operating status information returned by the controlled device via the communication connection, in response to the first status obtaining request sent by the first sending sub-module 311.

The apparatus in this embodiment may implement the technical solution shown in the method embodiment of FIG. 4, and the implementation principle and technical effect are similar, which will not be elaborated.

Figure 10:
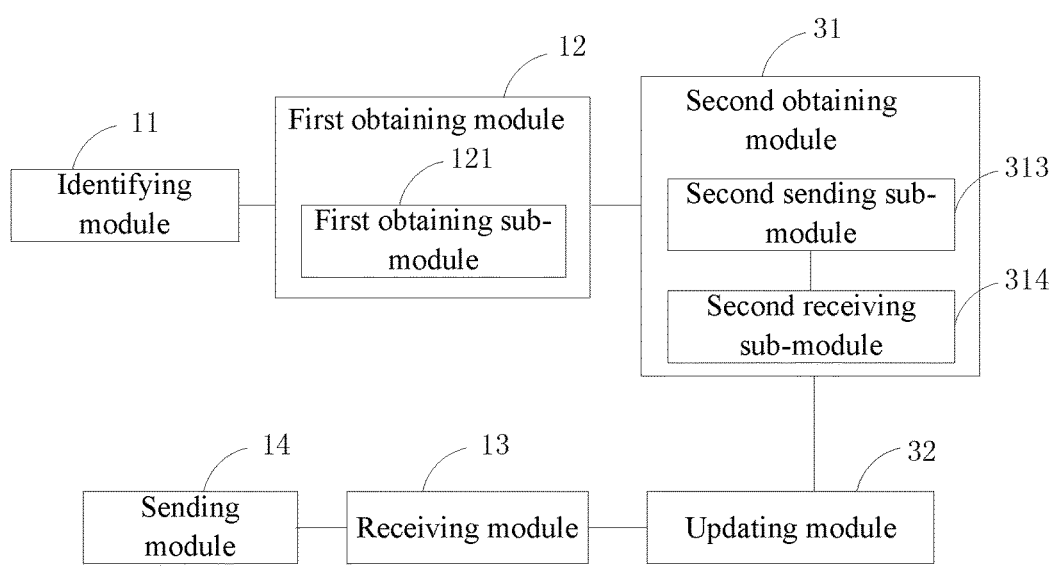
FIG. 10 is a block diagram of a fifth embodiment of an apparatus for controlling a device according to an exemplary embodiment.

FIG. 10 is a block diagram of a fifth embodiment of an apparatus for controlling a device according to an exemplary embodiment. As shown in FIG. 10, based on the embodiment of FIG. 8, the second obtaining module 31 includes: a second sending sub-module 313 and a second receiving sub-module 314.

The second sending sub-module 313 is configured to send a second status obtaining request that comprises the identity image and a user account to a server, to make the server inquire and obtain the operating status information corresponding to the identity image from a database containing the information of correspondence relationships between identity images and control interfaces of respective controlled devices corresponding to the user account; the second receiving sub-module 314 is configured to receive the operating status information sent by the server, in response to the second status obtaining request sent by the second sending sub-module 313.

The apparatus in this embodiment may implement the technical solution shown in the method embodiment of FIG. 5, and the implementation principle and technical effect are similar, which will not be elaborated.

With respect to the apparatuses in the above embodiments, the specific manners for performing operations for individual modules and sub-modules therein have been described in detail in the embodiments regarding the methods for controlling devices, which will not be elaborated herein.

Figure 11:
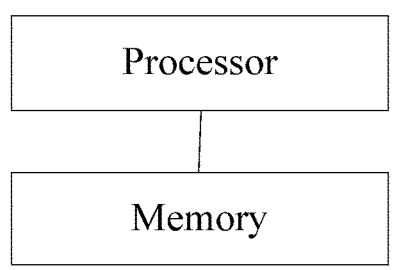
FIG. 11 is a block diagram of a terminal device according to an exemplary embodiment.

The previous description involves internal functions and structures of the apparatus for controlling devices. As shown in FIG. 11, the apparatus may be realized as a terminal device in practice. The terminal device includes a processor, and a memory configured to store an instruction executable by the processor, in which the processor is configured to perform the above-described methods.

In the above embodiments, when it is required to control the controlled device, user's terminal device identifies the controlled device by identifying the identity image of the controlled device; the user is able to trigger the control operation of the controlled device through the control interface after obtaining the control interface of the controlled device according to the identity image; hence the terminal device sends the control operation to the controlled device through the communication connection established with the controlled device, so as to realize the control over the controlled device. In this technical solution, the user may identify respective controlled devices and obtain corresponding control interfaces of the controlled devices conveniently by identifying identity images of respective controlled devices using the same user terminal, thus realizing convenient control over the controlled devices through the control interfaces.

Figure 12:
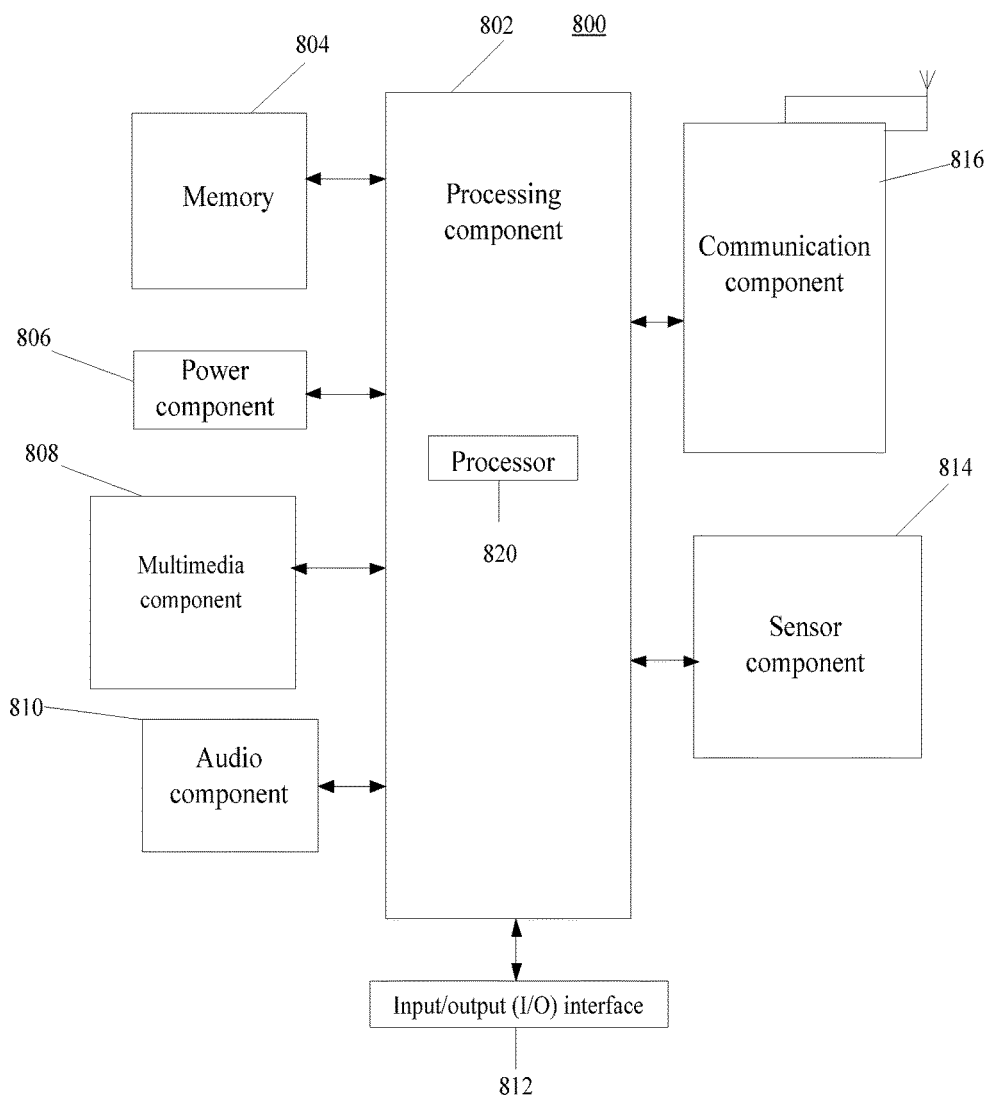
FIG. 12 is a block diagram of another terminal device according to an exemplary embodiment.

FIG. 12 is a block diagram of another terminal device according to an exemplary embodiment. For example, the terminal device 800 may be a mobile phone, a personal computer, a portable computer, a tablet computer and the like.

Referring to FIG. 12, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device 800 and other devices. The terminal device 800 can access a wireless network based on a communication standard, such as WiFi, 2Q or 3Q or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal device 800, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium has stored therein instructions that, when executed by a processor of the terminal device 800, causes the terminal device 800 to perform a method for controlling a device.

The method includes: identifying an identity image of a controlled device; obtaining a control interface of the controlled device according to the identity image; receiving a control operation instruction triggered by a user based on the control interface; and sending the control operation instruction to the controlled device by establishing communication connection with the controlled device.

Other embodiments of the present disclosure will be apparent to those skilled in the art from consideration of the specification and practice of the disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a device, comprising:
    identifying an identity image of a controlled device used for identifying the controlled device;
    obtaining a control interface of the controlled device according to the identity image;
    obtaining operating status information of the controlled device;
    receiving a control operation instruction triggered by a user through the control interface;
    determining whether a communication connection with the controlled device is currently established according to a connection status indicator corresponding to the identity image, wherein the connection status indicator is configured to indicate a communication connection status with the controlled device;
    analyzing and obtaining a device identifier of the controlled device corresponding to the identity image if the communication connection with the controlled device is not established;
    establishing the communication connection with the controlled device according to the device identifier of the controlled device; and
    sending the control operation instruction to the controlled device through the established communication connection with the controlled device,
    wherein obtaining the operating status information of the controlled device comprises:
    sending a second status obtaining request that comprises the identity image and a user account to a server, to make the server inquire and obtain the operating status information corresponding to the identity image from a database stored with correspondence relationships between identity images and control interfaces of respective controlled devices corresponding to the user account; and receiving the operating status information sent by the server.

2. The method according to claim 1, wherein obtaining the control interface of the controlled device according to the identity image comprises:

inquiring and obtaining the control interface corresponding to the identity image from a database stored with correspondence relationships between identity images and control interfaces of respective controlled devices.

3. The method according to claim 1, after obtaining the operating status information of the controlled device, further comprising:

updating a display status of a corresponding control key on the control interface according to the operating status information.

4. The method according to claim 1, wherein the identity image comprises a two-dimensional code image.

5. A terminal device, comprising:

a processor;

a memory configured to store an instruction executable by the processor;

wherein the processor is configured to:

identify an identity image of a controlled device used for identifying the controlled device;

obtain a control interface of the controlled device according to the identity image;

obtain operating status information of the controlled device;

receive a control operation instruction triggered by a user through the control interface;

determine whether a communication connection with the controlled device is currently established according to a connection status indicator corresponding to the identity image, wherein the connection status indicator is configured to indicate a communication connection status with the controlled device;

analyze and obtain a device identifier of the controlled device corresponding to the identity image if the communication connection with the controlled device is not established;

establish the communication connection with the controlled device according to the device identifier of the controlled device; and send the control operation instruction to the controlled device through the established communication connection with the controlled device, wherein the processor is configured to obtain the operating status information of the controlled device by:

sending a second status obtaining request that comprises the identity image and a user account to a server, to make the server inquire and obtain the operating status information corresponding to the identity image from a database stored with correspondence relationships between identity images and control interfaces of respective controlled devices corresponding to the user account; and receiving the operating status information sent by the server.

6. The terminal device according to 5, wherein the processor is configured to obtain the control interface of the controlled device according to the identity image by:

inquiring and obtaining the control interface corresponding to the identity image from a database stored with correspondence relationships between identity images and control interfaces of respective controlled devices.

7. The terminal device according to 5, wherein after obtaining the operating status information of the controlled device, the processor is configured to:

update a display status of a corresponding control key on the control interface according to the operating status information.

8. The terminal device according to 5, wherein the identity image comprises a two-dimensional code image.

9. A non-transitory computer-readable storage medium having stored therein instructions that, when executed by a processor of a terminal device, causes the terminal device to perform a method for controlling a device, the method comprising:

identifying an identity image of a controlled device used for identifying the controlled device;

obtaining a control interface of the controlled device according to the identity image;

obtaining operating status information of the controlled device;

receiving a control operation instruction triggered by a user through the control interface;

determining whether a communication connection with the controlled device is currently established according to a connection status indicator corresponding to the identity image, wherein the connection status indicator is configured to indicate a communication connection status with the controlled device;

analyzing and obtaining a device identifier of the controlled device corresponding to the identity image if the communication connection with the controlled device is not established;

establishing the communication connection with the controlled device according to the device identifier of the controlled device; and sending the control operation instruction to the controlled device through the established communication connection with the controlled device, wherein obtaining the operating status information of the controlled device comprises:

sending a second status obtaining request that comprises the identity image and a user account to a server, to make the server inquire and obtain the operating status information corresponding to the identity image from a database stored with correspondence relationships between identity images and control interfaces of respective controlled devices corresponding to the user account; and receiving the operating status information sent by the server.

10. The non-transitory computer-readable storage medium according to claim 9, wherein after obtaining the operating status information of the controlled device, the method further comprises:

updating a display status of a corresponding control key on the control interface according to the operating status in nation.

* * * * *